(12) United States Patent
Bhogal et al.

(10) Patent No.: US 8,140,340 B2
(45) Date of Patent: Mar. 20, 2012

(54) USING VOICE BIOMETRICS ACROSS VIRTUAL ENVIRONMENTS IN ASSOCIATION WITH AN AVATAR'S MOVEMENTS

(75) Inventors: Kulvir S. Bhogal, Fort Worth, TX (US); Rick A. Hamilton, II, Charlottesville, VA (US); Dimitri Kanevsky, Ossining, NY (US); Clifford A. Pickover, Yorktown Heights, NY (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 817 days.

(21) Appl. No.: 12/016,823

(22) Filed: Jan. 18, 2008

(65) Prior Publication Data

US 2009/0187405 A1    Jul. 23, 2009

(51) Int. Cl.
*G10L 15/22* (2006.01)
*G06F 3/048* (2006.01)

(52) U.S. Cl. .................... 704/273; 704/275; 715/706

(58) Field of Classification Search .................... 704/273, 704/275; 715/706
See application file for complete search history.

(56) References Cited

U.S. PATENT DOCUMENTS

| | | | |
|---|---|---|---|
| 5,335,276 A * | 8/1994 | Thompson et al. ........... 380/266 |
| 5,736,982 A | 4/1998 | Suzuki et al. |
| 6,012,030 A * | 1/2000 | French-St. George et al. ............... 704/275 |
| 6,263,202 B1 * | 7/2001 | Kato et al. ................... 455/418 |
| 6,654,459 B1 | 11/2003 | Bala et al. |
| 6,987,514 B1 | 1/2006 | Beresin et al. |
| 7,006,616 B1 | 2/2006 | Christofferson et al. |
| 7,054,811 B2 | 5/2006 | Barzilay |
| 7,054,819 B1 * | 5/2006 | Loveland ...................... 704/273 |
| 7,093,007 B2 | 8/2006 | Patton et al. |
| 7,376,645 B2 * | 5/2008 | Bernard .............................. 1/1 |
| 2001/0047263 A1 * | 11/2001 | Smith et al. ................... 704/275 |
| 2004/0128350 A1 | 7/2004 | Topfl et al. |
| 2005/0063522 A1 | 3/2005 | Kim et al. |
| 2006/0122840 A1 * | 6/2006 | Anderson et al. ............. 704/275 |
| 2006/0229879 A1 * | 10/2006 | Yu et al. ........................ 704/273 |
| 2007/0294171 A1 * | 12/2007 | Sprunk ........................... 705/50 |
| 2008/0120558 A1 * | 5/2008 | Nathan et al. ................... 715/764 |
| 2009/0037905 A1 * | 2/2009 | Hamilton et al. ................... 718/1 |
| 2009/0046094 A1 * | 2/2009 | Hamilton et al. ............. 345/419 |
| 2009/0046102 A1 * | 2/2009 | Hamilton et al. ............. 345/474 |
| 2009/0046109 A1 * | 2/2009 | Hamilton et al. ............. 345/619 |
| 2009/0089364 A1 * | 4/2009 | Hamilton, II et al. ........ 709/203 |
| 2009/0094029 A1 * | 4/2009 | Koch et al. .................... 704/246 |
| 2009/0109180 A1 * | 4/2009 | Do et al. ........................ 345/173 |
| 2009/0113524 A1 * | 4/2009 | Hamilton et al. ................. 726/4 |
| 2009/0125481 A1 * | 5/2009 | Mendes da Costa et al. ..... 707/3 |
| 2009/0150802 A1 * | 6/2009 | Do et al. ........................ 715/757 |
| 2010/0017209 A1 * | 1/2010 | Yu et al. ........................ 704/246 |
| 2010/0094635 A1 * | 4/2010 | Bermudez Perez ........ 704/270.1 |

* cited by examiner

*Primary Examiner* — Talivaldis Ivars Smits
(74) *Attorney, Agent, or Firm* — Stephen J. Walder, Jr.; Mark C. Vallone (57) ABSTRACT

Mechanisms are provided for utilizing a voiceprint to authorize a user to perform an operation restricted to authorized users. A voiceprint is stored in an audio attribute file and is associated with a user. Based on a comparison of this voiceprint and an utterance provided by the user, an identification of the user is accomplished. If the utterance matches the voiceprint, the user is permitted to access services or perform operations. The audio attribute file may be transmitted from one virtual environment to another based on the detected movement of the user's avatar between virtual environments. As such, the recipient computing device may use the audio attribute file to identify the user in the new virtual environment.

20 Claims, 4 Drawing Sheets

USING VOICE BIOMETRICS ACROSS VIRTUAL ENVIRONMENTS IN ASSOCIATION WITH AN AVATAR'S MOVEMENTS

FIELD

The present disclosure relates generally to Internet or World Wide Web interactions and more particularly to using voice biometrics in Internet based activities.

BACKGROUND

Using the Internet to operate in a three dimensional (3D) virtual environment or virtual universe utilizing a computer is a pass-time that is gaining popularity with many. A 3D virtual universe (VU) is an interactive simulated environment provided to a user over a communications network such as the Internet. The VU can be accessed by multiple users, where users can interact through an "online" interface via a user's or a participant's computer. Some VUs provide a game setting where multiple users can compete, fight or build empires or infrastructure in a competitive environment. Users can inhabit and interact in the VU via human type icons, where the VU can be a two or three-dimensional graphical representations of these human type icons often referred to as avatars or "humanoids." Alternately described, an avatar can be a graphical representation that a user can select to represent himself/herself in the VU that others can see and possibly interact with. An avatar often takes the form of a "cartoon-like" human. Avatars or participant's can typically speak to one another via a voice over internet protocol (VoIP) connection provided by the VU.

Virtual environments or VUs are referred to by many different terms. For example, a virtual environment can be referred to as a "metaverse," a "3D Internet" a virtual world, and so on. As utilized herein, a virtual universe (VU) is intended to encompass all of these environments where a user can move about and interact with others via a communication network. Although there are many different types of VUs, there are several features many VUs have in common. For example, many VUs have shared space or regions which is a "universe" that allows many users to concurrently participate in an activity. The VU residents or avatars can traverse, inhabit, and interact with other avatars via 3-D graphics and landscapes. Thus, a VU can be populated by many thousands of residents or avatars. Often, the VU resembles the real world in terms of physics or physical laws, houses, and landscapes etc.

Many virtual environments also utilize a graphical user interface (GUI). The GUI can depict the environment or some form of "space" visually, ranging in style from 2D "cartoon" imagery to more immersive 3D environment and the GUI can accept user input. In addition, many virtual environments can provide immediacy, interactivity, and persistence. Immediacy allows interactions between a user's avatar and the environment to take place in real time or based on "wall clock time." Interactivity with the environment allows users to alter, develop, build, or submit customized content. Persistence provides a continuous environment regardless of whether individual users are logged in.

Many virtual environments also have agents, regions, assets, and textures. An agent can be a software resource which represents some portion of a user in the virtual world. Agents can be hosted in agent servers. An agent may cause an avatar to be instantiated on behalf of a user. An agent can mediate, for the user, by acting as the software endpoint in the system which invokes various services within the web at the user's direction, generally via the user's client. A region can be a defined area within the virtual universe. An asset can be an entity which can be transferred from agent to agent or from agent to region or from region to agent. An asset can be something like an object, texture, sound, link, landmark, and so forth.

The Internet is commonly referred to as the World Wide Web and will be referred to herein as the "Web." The Web is generally a hypertext-based, distributed information system. Hypertext is generally speaking, text that when selected, can link a user to other documents or another service possibly from other servers. When using a VU a user may want to transition from the VU to an Internet based service provider such as a provider for online commerce and hypertext and browsers make it easy to make this transition. The Web can present the user with documents, called web pages, full of links to other documents or information systems or even links to interactive systems such as VUs. Selecting one of these links, the user can access more information about a particular topic or a move to different mediums such as to VUs or between VUs. Accordingly, Web pages can include text as well as multimedia (images, video, animation, sound). As with VUs, product information can be acquired and purchases can also be made via the Web.

Presently users can be engaged in both a VU medium and browsing and participants commonly move from one medium to the other and back. It is also common for services provided by websites to have associated services existing in a VU. For example, the company "Circuit City" has both a web site and a VU store. Generally, there is limited inter-operability between these two mediums because different mediums typically do not freely exchange information.

Some services support a user's transcendence from the VU to Web sites. For example some services pass information from a VU to a Web site via a universal resource indicator (URI). A URI can be a formatted string of alphanumeric characters that serves as an identifier for a resource, typically on the Internet. URIs can be utilized in HTML code to identify the anchors of hyperlinks. URIs in common practice include Uniform Resource Locators (URLs) and relative URLs. Usage of URI's can react to the user selecting or pointing and clicking on a link in the VU to get to the web site.

Within VUs, communication has traditionally been done through text. However increasingly, voice has been utilized as it is a more natural means of communication. In addition for most people, verbal communication is quicker and more efficient than textual communication. However, such a communication format is not always available from service providers.

SUMMARY

The problems identified above are in large part addressed by the systems, arrangements, methods and media disclosed herein to identify an avatar with an online service which can utilize audio biometrics. The method can include prompting a client application with a request for an utterance, processing the reply to the request and creating a voiceprint or a voice profile of the speaker or participant. The voiceprint can be associated with an avatar and when an utterance is received, the avatar can be identified by comparing the utterance to the voiceprint. Such a compare function can be utilized to identify avatars as they move from on-line service to on-line service and in some embodiments voice biometrics can be utilized to authenticate an avatar for specific activities.

In some embodiments, a transmission can be sent to a client application where the transmission can request an utterance from the participant. A client application (via a speaking participant) can return an utterance to create a baseline voiceprint for the avatar/participant. Later, when a participant associated with the avatar speaks, the avatar can be identified and/or authenticated using the voice print as a metric. This identification/authentication process can be useful when an avatar moves from service provider to service provider because re-authentication can be avoided. The identification/authentication process can also be useful when the avatar tries to log into a service, tries to move to a restricted area or tries to purchase a good or service via the Web. In some embodiments, the participant can be prompted for an authentication utterance based on a trigger prompted by the avatars activity. The avatars activity may be an activity that invokes a change in Web based-Web type services. The trigger can result from many different phenomena such as an avatars entry to a new area, to a request for goods or services or possibly just due to the expiration of a predetermined time period.

The transmission of the participant's utterance can be supplemented with additional security measures. Additional security measures can include transmitting a unique universal identifier (UUID) with the participant's utterance. Additional identifiers could also be sent with the voice transmission such as a media access control identifier. In other embodiments, the transmission or the voice can be encrypted prior to transmission. Additional security measures can include time stamping the transmissions and comparing the received transmission to real time or wall clock time. In some embodiments, the participant can modify their voice with, for example a mix of celebrity voices and other characteristics, and the identification can be done based on the modified voice settings.

In some embodiments, a system is disclosed that has a processing module that can provide transmissions to a client application and can provide an interactive environment with an avatar. The system can also include a voice biometric module coupled to the processing module that can send an enrollment request to the client application and can receive a reply from the client application to create the voiceprint for the avatar. In addition, the system can include an authentication module to receive voice transmissions from the client application and to compare the voice transmissions with the voiceprint and authenticate the avatar.

In other embodiments, the voice biometric module and the authentication module can be operated by an on-line service provider that is remotely located from the client or VU processing modules. The service provider can be implemented as a third party Web based server provider. The Web based server can be a VU type server or an e-commerce type server. The voice biometric module can have a text to speech converter to determine if a participant response to a question is a coherent response. The system can include a voice reconstruction module coupled to the voice biometric module to reconstruct a modified voice.

In some embodiments, a machine-accessible medium containing instructions to operate a processing system which, when the instructions are executed by a machine, can cause the machine to perform voice biometrics. The operations can include prompting a client application with an utterance request, receiving a reply to the prompting, processing the reply to create a voice profile, storing a voiceprint associate the voice profile with an avatar of a virtual universe, receiving an utterance associated with the avatar, and identifying the avatar based on the received utterance.

In some embodiments, the computer can transmit a prompt to cause the client application to prompt a participant for an utterance to authenticate the participant when the avatar moves to a new medium. The medium, when executed can cause the computer to prompt the client application for an utterance to authenticate the participant based on the expiration of a predetermined time period. The medium when executed can cause the computer to provide security features such as encrypting the utterance prior to transmission of the utterance. In addition, the medium can cause the computer to time-stamp the utterance and compare the timestamp to wall clock, present or actual time as a further method of authentication.

BRIEF DESCRIPTION OF THE DRAWINGS

Aspects of the invention will become apparent upon reading the following detailed description and upon reference to the accompanying drawings in which like references may indicate similar elements.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Arrangements are disclosed herein to identify an avatar or participant in online activities, including interactions with a virtual universe and an e-commerce server where the identification can be acquired utilizing audio biometrics. Speaker verification or voice based authentication can be achieved by computers executing instructions and such and identity/authentication process can confirm with a relatively high probability that a voice belongs to a particular speaker/participant/avatar. It has been determined that speech of each individual typically has unique attributes or qualities such qualities can be utilized to accurately identify the speaker. Such speaker verification systems can utilize acoustic features of an individual's speech to identify, verify or authenticate a speaker.

In some embodiments, a client application can create a customized avatar voice based on user settings and the customized voice can be utilized in on-line social and business settings. The customized voice can be a computer modified voice that can be utilized by a VU server or another immersive 3D environment type server to provide an improved experience to the speaker/participant. For example, the customized/personalized voice can be utilized to identify the avatar and possibly to authenticate and authorize the avatar for access to specific services. The system can allow the participant to modify their voice and a modified or unmodified voice can be utilized to identify and/or authenticate the participant. Thus, an automatic and transparent participant identification and authorization can be provided by online service provides. In some embodiments, on-line service providers can exchange information like voice prints such that authorization of an avatar as it moves among different service providers can be a seamless event. For example, an avatar may move between VUs, (or VU servers) and an e-commerce Web site, facilitated by a Web server. A voice may be modified or translated after it is authenticated.

In some embodiments disclosed herein, different types of applications (browsers, virtual universe (VU) clients, VU servers, commerce servers etc), can utilize voice biometrics to authenticate users/avatars that move about/between various Web based services/Web sites. Accordingly, voice verification services can be shared between multiple distinct on-line mediums, such as Web servers that sell goods, and for example VU servers. Such interoperability can enhance a user's experience, can provide improved system security allowing for seamless transitions as a user moves between different online services or between different on-line service providers/mediums.

In some embodiments, a system is disclosed that can include a processing module to provide transmissions to a client application. The transmission can provide an interactive environment with an avatar and a voice biometric module. The voice biometric module can send an enrollment request to the client application, and can receive a reply from the client application. The voice biometric module can create a voiceprint or voice profile for the avatar. The system can also include an authentication module coupled to the voice biometric module to receive voice transmissions from the client application and to compare the voice transmissions with the voice profile. The module can then authenticate the avatar based on the comparison.

Figure 1:
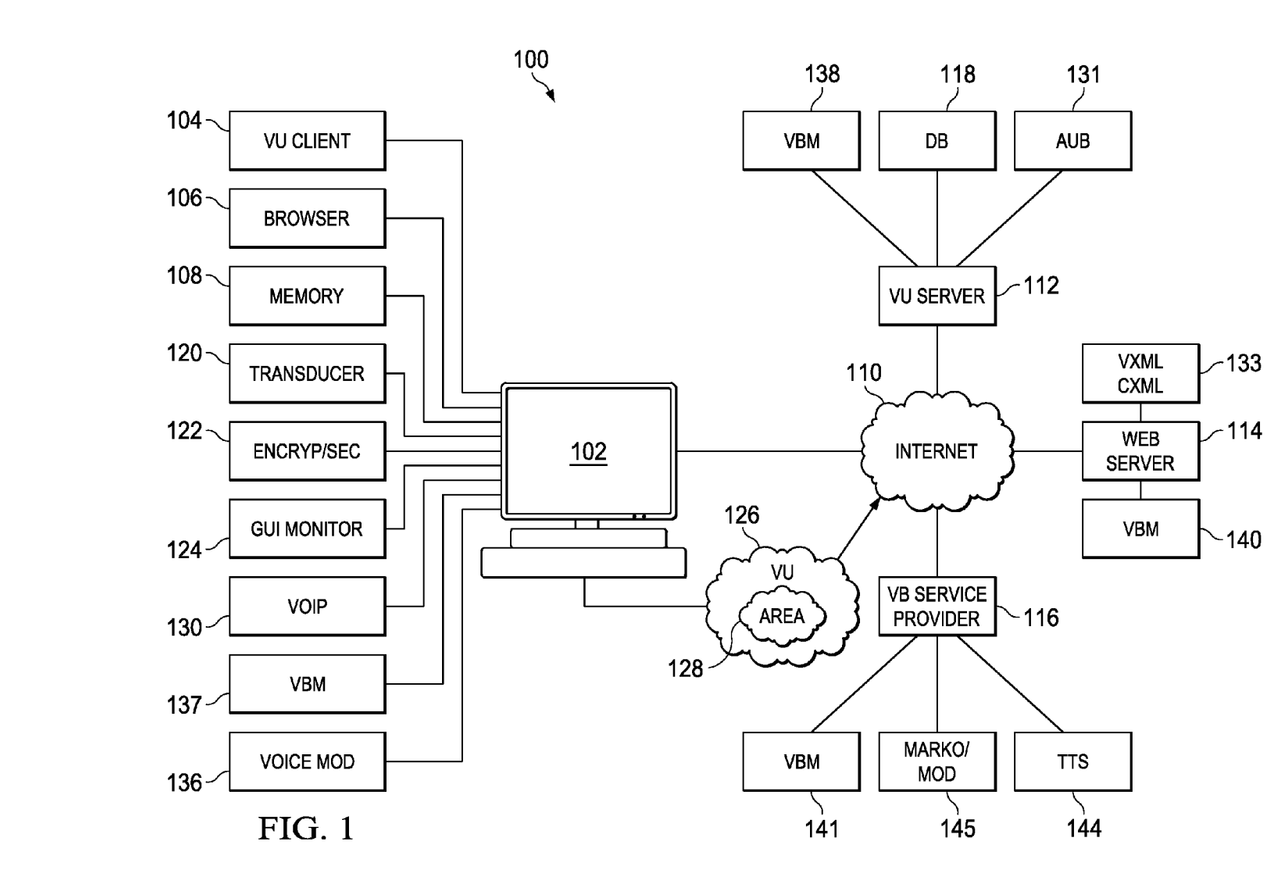
FIG. 1 depicts a high-level block diagram of a network environment.

FIG. 1 is a block diagram depicting a networking environment 100 that can identify a participant/avatar based on audio transmitted over a network such as the Internet 110. Such audio transmitted by the participant's computer can be the "actual" audio spoken by the participant or can be modified audio. A participant can configure his or her computer to modify the participant's voice based on user selectable configurations. The system 100 can include the Web or Internet 110 that can interconnect; a VU server 112, a web server 114, a voice biometric service provider 116 and a client computer/application 102.

The VU server 112 can include a database 118 for storing voice prints, a voice biometric module 138, and an authorization module 131 for comparing voice prints to the received utterance. The Web server 114 can have a voice biometric module 140 and a voice extensible markup language/communication extensible markup language module 133. Voice biometric service provider 116 can include a voice biometric module 141, and a Markov modeling module 145. The client computer 102 can include many different modules that provide different types of interactive services and functions to a participant. The client computer 102 can include a VU client 104, a Web browser 106, memory 108 that can store files such as voice modification files, a transducer 120 such as a microphone to convert audio into an electronic signal, an encryption/security module 122, a monitor to display a graphical user interface (GUI) 124, a voice over Internet protocol (VoIP) module 130, a voice biometric module 137, and a voice modification module 136.

In operation, the system can provide at least three distinct modes of operation a "calibration" mode, an "identification" mode and a "handoff" mode. In the calibration mode, a participant can get "enrolled" in the system and a participant's voiceprint can be acquired for future identification, authentication use. The enrollment process can take many different forms. In one form, text can appear on the monitor 124 of the computer 102 and the participant can be queried by one of the servers (112, 114, or 116) to speak into the transducer 120. The resulting signal can be encrypted by encryption module 122 and converted to a VoIP protocol, via VoIP module 130, and the signal can be sent over the Internet 110 to the voice biometric modules 138, 140, and 141 of the servers 112, 114, or 116. During this enrollment process, a sample of the speaker's voice can be received and stored and a "voiceprint" of a participant can be established.

During an identification mode, a participant in an on-line activity facilitated by servers 112, 114, and 116 may be uttering or talking as they interact with the servers 112, 114, and 116. Thus, a participant (and the avatar associated with the participant) can be identified and possibly authenticated if the participant utters as he or she is participating in an on-line activity. In some embodiments, one of the servers 112, 114, or 116 or even the local voice biometric module 137 can periodically request the participant provide an utterance such that audio from the participant can be analyzed by a biometric module (i.e. one of 137, 138, 140, and 141). Thus, the utterances can be continuously compared to the voiceprint to verify the participant at one or many locations.

In another mode, the avatar or participant can move from service provider to service provider, possibly from receiving services from VU server 112 to receiving services from Web server 114 and the identification or even the identification process can be "handed-off" or transferred to different service providers. Thus, a voiceprint or avatar audio attribute file data can be acquired, imported, exported, and updated by various applications and such data can be stored at various locations. This allows for the transition between on-line service providers to be seamless. Such a seamless transition can also be facilitated by voice biometric service provider 116 that could from a remote location provide service to numerous servers or participants.

In some embodiments, a participant might be asked to speak or to utter a specific phrase when a system such as VU server 112 or web server 114 wants an identification or authentication at any time after enrollment. Thus, authentication may be based on the participant reciting a predetermined or preset "pass-phrase" where free-form text can be spoken by the participant and after receipt of such a recital by a voice biometric module, (such as modules 137, 138, 140 and 141), the received recital can be compared with the stored voiceprint. The voice biometric modules 137-141 can have a compare function to compare incoming audio to the stored voice print and can identify/authenticate the avatar. If the received utterance can be effectively matched to the voiceprint the user can be identified and/or authenticated.

As stated above, the voice authentication service could be provided locally by voice biometric module 137 or remotely by voice biometric modules 138 140, or 141. Accordingly, avatar voice attributes (including a voice print) created by the local voice biometric module 137 could be retrieved from memory 108 and utilized to authenticate the user locally at the client computer 102. Voice biometric module 141 could also be located remotely and could be operated as a third party authentication service provider. In other embodiments a corporate or business group could use a local server to authenticate employees or participants.

In some embodiments, a voiceprint or a voice attribute file could be created by one voice biometric module 132 and the voiceprint/attribute information could be shared between servers 112, 114, and 116 such that a seamless transition between different types of interactive services can be provided to a participant. For example, the voice attribute file could be shared between interactive services such as a Web based server 114 for purchasing items, a browser 106 and a VU client or a VU application 104 and a VU server 112.

Figure 4:
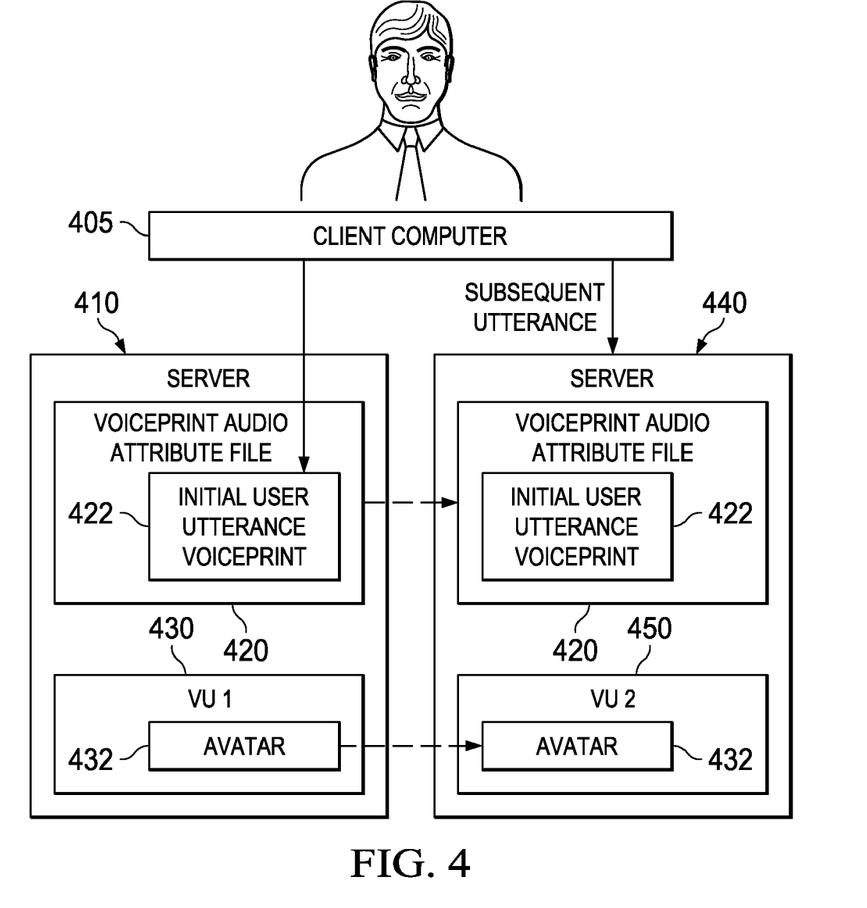
FIG. 4 is an example block diagram illustrating a migration of an avatar and its associated voiceprint audio attribute file from one server to another in accordance with one illustrative embodiment.

As stated above, generally, users are represented as avatars within a VU. In some embodiments, avatars may be able to move seamlessly across different settings, such as between different VUs, or from a VU setting to a gaming setting or from a VU setting to a commerce based Website, where the participant can "handle" goods in a VU and purchase such goods. Such different environments can be provided by different servers of only which two are illustrated (112 and 114). For example, with reference to FIG. 4, a user's avatar 432 may move from a first VU 430 of a first server 410 to a second VU 450 of a second server 440. In response to this movement of the avatar 432 from one VU 430 to another VU 450, the voiceprint audio attribute file 420 containing the initial user utterance voiceprint 422 of the user that is associated with the avatar 432 may likewise be transmitted from the server 410 to the server 440. To provide a seamless transition between these environments, the system 100 can authenticate the avatar via a participant's voice as the avatar moves to the new setting. For example, with reference again to FIG. 4, after migration of the voiceprint audio attribute file 420 from server 410 to the server 440, a subsequent utterance may be obtained from the user via the client computer 405 which may be compared against the voiceprint audio attribute file 420 for authentication purposes on the server 440. Thus, when there is a setting change as an avatar moves to a different VU provided by a different service provider, the user may be able to avoid interrupts and delays cause by sign-up, login, and authentication. The VU client 104 can also provide authorization/access to particular areas 128 of a virtual universe based on the voice authentication.

Voice modification module 136 can provide many options for creating a modified voice. A participant may want to "assemble" or modify their voice by blending several voice types (voice attributes) together. For example, a participant may want to blend Marilyn Monroe's voice with Eleanor Roosevelt's voice. In other examples, a modified voice may be constructed using a user specified percentage of the users voice or select a setting where the users voice influences certain aspects of what is transmitted to be authenticated.

In some embodiments, the user could control the voice modification module 136 specify utilizing twenty five percent (25%) of the user's own voice, fifty percent (50%) of a celebrity voice such as Ronald Regan's voice and twenty five percent (25%) of a voice generated solely by the computer. Voice modification module 136 or voice biometric modules 137-141 could digitize phonemes, diphones, or entire words of speakers and then using digital processing provide the desired modification to the audio as it is transmitted. This digitization of spoken words could allow for the creation of a library of digital waveforms for such sounds or words spoken by the participant and such a user selected setting could be utilized by the voice biometric modules 137-141 as a voiceprint.

Blending by the voice modification module 136 may take place by summing the waveforms for each component speaker selected by the participant. In one embodiment, a voice modification module 136 can display sliding switches on the GUI/monitor 124. In some embodiments the GUI/monitor 124 can have sliding switches or "sliders" such as those found on an audio mixing board where each slider can correspond to different component voices. Moving the slider from 0 to 1 can control a coefficient for a voice blending equation: $A = c1*v1 + c2*v2 + c3*v3 \ldots$, where c is an amplitude scale factor and v corresponds to the digital voice waveforms for the different component/virtual speakers. It can be appreciated that even 10 sliders can provide a large number of blended voice combinations. The VU client 104 could store the user configured voice settings in memory 108 where the user selected voice modification settings could be utilized by the voice modification module 136 to create the modified voice from the user's voice. The memory 108 could also store VU attributes such as avatar items, objects or an avatar's universal unique identifier (UUID) and the voice attributes could be organized with other avatar attributes.

It can also be appreciated that the disclosed blend process makes it possible to create voices that may be more memorable and distinctive and easier to understand than one's own voice. This may be useful in social and business settings (e.g. sales people, customer, and help desk settings) and may provide improved accessibility for the hearing impaired. In addition, the voice modification module may "translate" broken English or "clean-up" broke English accepted from an individual with poor speaking skills such as those with a non-native dialect. Such a modification could make a participant's voice more understandable for others participating or immersed in the VU. The modified voice can be utilized by the voice biometric modules 137, 138, 140 and 141 for identity, authentication and/or other purposes.

VU participants might prefer to use a modified voice to retain a certain level of privacy. Even with modified voices, voice recognition algorithms may enable a modified voice to be unique to an individual by adding additional information to the voice. Thus, an identical voice modification setting on two different graphical user interfaces (computers) can still provide a unique identification to an authentication system. Accordingly, the identical setting could be utilized by many participants and authentication could still be an effective means of identification.

It can be appreciated that voice biometric authentication may not be fool-proof. For example, voice prints may be faked by a hacker. Thus, encryption/security module 122 can provide additional modes of security. As stated above, a participant's natural voice may be sent to the voice biometric modules 138, 140 and 141 for authentication and the voice biometric modules 137, 140 and 141 may provide the conversion after authentication occurs. However, a natural voice, a blended voice or fabricated/assembled voice may be utilized by the voice biometric modules 138, 140 and 141 to identify/authenticate a participant. This avatar voice may be converted to text by a text to speech module 144 and the voice biometric module could process the text as part of the authentication/verification process.

To prevent at least some hacking, the inputs to the encryption/security module 122 can provide functions that are unknown to others or other computers where each function can have a slightly different function or key. Combining additional participant characteristics unique to a participant or VU can improve the authentication of the system. These additional measures can include an avatar's attributes such as a universally unique identifier (UUID), a timestamp, a media access control address or other unique or semi-unique characteristics. If a timestamp is utilized, and the authentication system receives the utterance without a timestamp or with a time stamp that indicates that a longer than expected (predetermined) time delay has elapsed, the authentication system can deny authentication. Such a dual parameter system can prevent hacking by one with a recording device that records and retransmits data. The timestamp and the voice can be encrypted by encryption/security module 122 before it is transmitted to the authentication system. Upon receipt, the voice biometric modules 137-141 can examine the timestamp to determine that the voice transmission was not recorded earlier in time thus providing an additional level of security.

In some embodiments the web server 114 could provide a "virtual store" to the participant and the web server 114 could use the voice biometric module as an identification/authorization system for modifying content provided to the participant much like cookies are utilized. The voice biometric module 140 could be provided with an encrypted "voice reference template" from other voice biometric modules 137, 140, and 141 so that the voice biometric module 140 can compare incoming audio to past voice identification data. Thus, the participant can be moving among online services and the template can be passed to the new environment such that the participant can be recognized across different mediums.

As stated above, participant identification can be done by a remote server such as voice biometric service provider 116. In this embodiment, the VU client 104, the browser 106, the VU server 112 and the web server 114 can all access the remote service provider 116 to get templates, actual authorization and other verification type data. In these embodiments the service provider 116 can act as a clearing house for verification services. Such inter-operation of verification services can provide an enhanced experience for users who move back and forth between a VU mode and a web site/browser mode or who move between different VUs using computer 102.

When the user transitions into, or out of a mode such as into or out of the VU using VU client 104, the VU server or the web server 114 may search for the avatars voice attribute file such that it can be utilized to identify the avatar. In one embodiment, when the VU client 104 is connected the VU client 104 or the browser 106 could trigger a request for verification/authentication. In other embodiments, the identification/authentication process could occur at specified time intervals based on a timer or real time, possibly during VU client 104 operations. Transmission and retrieval of voice based biometric data may or may not be secure or encrypted, depending on user settings and protocol implementation. In some embodiments, the user could control or provide a setting where the voice attribute storage process could be accomplished with different browser security settings, privacy settings and an authentication.

When a participant via an avatar enters an area such as area 128 or a Web site, the item they were shopping for could be placed in their virtual shopping cart, and they could view it in three dimensions and complete their purchase from within the VU 126 (or vice versa). When the user returned to the Website supplied by the web server 114, the item they purchased from within the VU 112 may be removed from their web shopping cart as the voice authentication could be utilized to make this seamless transition. The multiple-use/shared voice attribute data can provide a versatile system for authenticating, tracking, and maintaining identification on residents that are purchasing goods via the Internet 110.

The voice attribute files can be further used by web servers 114 or VU servers 112 to differentiate residents and to operate in a way that depends on a particular resident's attributes. Sharable attribute data could be utilized in virtual shopping environments so that residents can more easily navigate between different VUs, different places of business, different buildings, and the client computer 102, adding or removing items from the Web or a "multiple-VU" shopping basket at any time. Sharable voice attribute files can also allow residents too automatically or seamlessly log into a website, VU region, multiple VUs, or gain admission to buildings in a VU. Users may also log in by inserting their credentials into a login page for the VU, building, web site, or a VU region where voice authentication is only a portion of the verification process.

Sharable voice attribute files can allow the servers (112, 114) to know that the user is already authenticated, and therefore is allowed to access services or authorized to perform operations that are restricted to authorized users. Sharable voice attribute files can be utilized to characterize preferred movements, gestures, and history of travel or other characteristics of an avatar. As stated above, a sharable attribute file could be utilized to allow or prevent accessibility to various features. In some embodiments, an individual that is hearing impaired or speech impaired can select a speech setting that may enhance their voice and make it more understandable. Likewise, an individual who has not mastered speaking a foreign language and has a "thick" accent may be able select a voice modification setting such that they are easier to understand. Thus, some users may set the voice modification module 136 such that their utterances may be easier to understand.

Such identification and authorization procedures allow for new levels of interoperability between web sites and VUs. Examples of well known computing systems, environments, and/or configurations that may be suitable for use with an exemplary computer include, but are not limited to, personal computers, server computers, thin clients, thick clients, handheld or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that perform particular tasks or implement particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

The voice biometric modules 137-141 can incorporate several variables or parameters in the recognition of one's voice/speech pattern. These parameters can include pitch, dynamics, and waveform. To help eliminate these types of variations during voice identification, the Markov modeling module 145 can provide hidden Markov modeling. The Markov modeling provides that the previous state of the voice is irrelevant for predicting the probability of subsequent receptions. In cases where the modified voice is unique to an individual because it uses attributes of the individual's voice, it may be used for authentication of that user. This may be true when the voice is assembled by a particular processing process that uses attributes of the participant. With these processing process, the voice may be used as a unique biometric.

Figure 2:
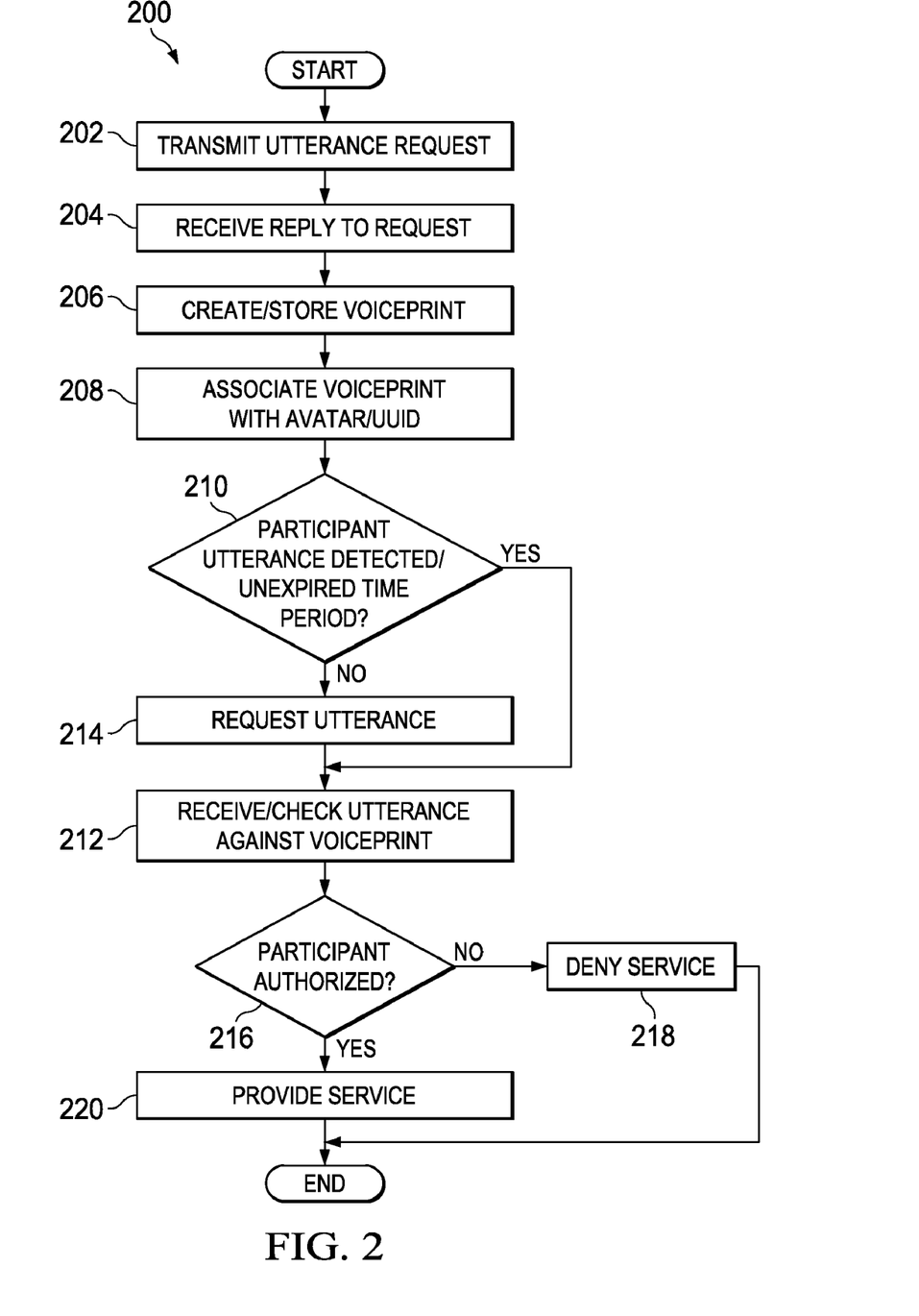
FIG. 2 is a flow diagram disclosing a method for managing audio data.

Referring to FIG. 2, a method for processing a voice in a VU is disclosed. The method can include using a unique modified or natural voice as a biometric to identify a user and for controlling certain aspects of a VU when the VU interacts with the participant. As illustrated by block 202, a system can transmit a request to a user requesting an utterance. Such a request can be in a verbal or in textual format. As illustrated by block 204, a response to the request can be received. Such a response will typically be received in a digital format such as a VoIP format via the Internet. The response can be utilized to create a voiceprint of the participant and the voice print can be stored by a biometric system, as illustrated by block 206.

As illustrated by block 208, the voiceprint can be associated with other attributes of an avatar. For example, the voiceprint can be associated with a unique universal identifier of an avatar. The user voiceprint could include many attribute identifiable by a biometric device. Such a voiceprint could be created utilizing known techniques in voice biometrics. The system can monitor audio from the participant's client system and can monitor the participant's utterances. In some embodiments the system can send a request to the participant requesting a verbal response.

As illustrated by block 210, as part of the identification/authorization process the system can determine if there has been participant utterances or if a predetermined time period has expired. If no utterances have been received or if the time period has expired then the system can request an utterance, as illustrated by block 214. As illustrated by block 212 the utterance can be received and the utterance can be checked against the voice print. As illustrated by decision block 216 it can be determined if the participant's voice can be recognized and if the participant is authorized.

If the participant is authorized, the service can be provided as illustrated by block 220. If the participant cannot be authorized then service can be denied as illustrated by block 218. The process can end thereafter. In decision block 210 an event can also occur that can trigger the request for an utterance of block 214. For example, when an avatar or a participant moves to a different VU or media, the system can activate a verification session as illustrated by blocks 212 and 216.

Figure 3:
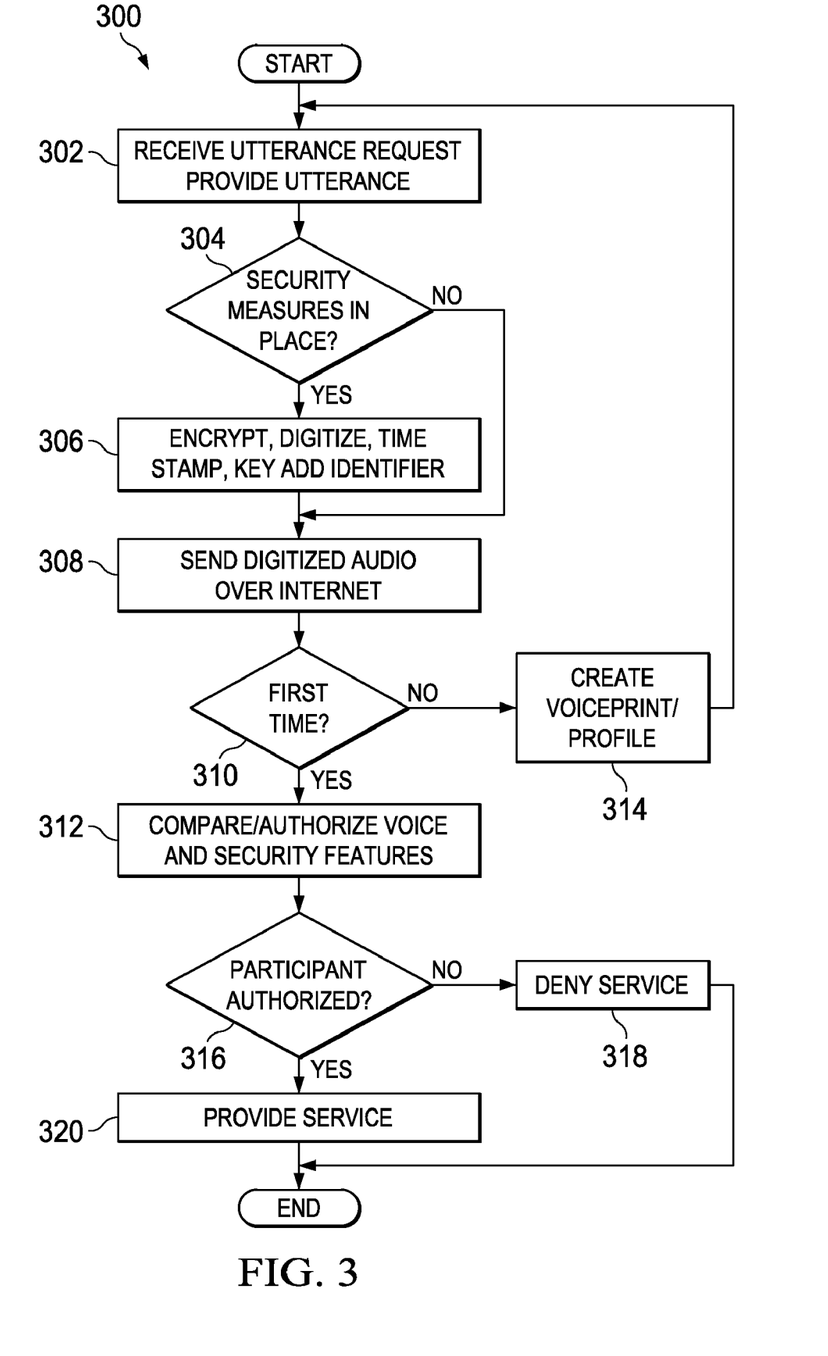
FIG. 3 is a flow diagram providing another method for managing audio data.

Referring to FIG. 3 a flow diagram for a client side avatar identification method is disclosed. As illustrated by block 302, a client application can receive an utterance request and provide an utterance. The client application can determine if there are one or more security measures in place, as illustrated by decision block 304. If security measures are in place, then the system can implement some form of security measures such as encryption, time stamping, keying and supplementing the voice transmission with an identifier as illustrated by block 306. Other authentication and/or security methods could also be utilized such as password, holding of token, etc.
. . .
As illustrated by block 308 the utterance can be digitized and sent over a communications network such as the Internet as illustrated by block 308. As illustrated by decision block 310 it can be determined if the received utterance is a first time occurrence. If the utterance is a first time occurrence then the system can create a voice print as illustrated by block 314 and the process can reiterate to block 302 and receive another utterance request. If the utterance received is not a first time for a participant, as determined at decision block 310, then the received utterance can be compared to an existing voiceprint and can be checked for the appropriate security measures as illustrated by block 312.

As illustrated by decision block 316 it can be determined if the participant's voice can be recognized and if the participant is authorized. If the participant is authorized the service can be provided as illustrated by block 320. If the participant cannot be authorized then service can be denied as illustrated by block 318. The process can end thereafter. In block 302 an event can trigger the utterance request where the event can be an avatar or a participant moving to a different VU or media, the system. With the time stamp security measure the client system can compare a timestamp on the sent utterance with real time. If the delta or time difference is greater than a predetermined number of seconds the system can deny speaker.

The biometric voice identification system can be utilized by Internet based systems such as a VU system to allow or deny access to such system including applications outside of the VU. If a user within a VU would like to access an application or system outside the VU from within the VU, the voice biometric may be used for such authentication. Systems that are "external" to the VU may require the voice biometric to be provided from within the VU in addition to or in lieu of, traditional username/password mechanisms. Thus VU based voice biometrics can be utilized to verify a participant in "real life." If someone wants to be identified/verified in real world, they can be identified/verified in a virtual setting first. Once confirmed in the virtual world, then a participant can be confirmed in real life. This process can require verification that the avatar of real person is a trusted avatar. When a verification of the linkage between real and virtual personalities is performed, verification of a real personality may be done via a virtual personality.

In such a configuration transactions outside of a VU can perform a verification process. For example, a user can indicate that they are about to complete a barter transaction outside of the VU and on the Web or by phone. The seller or vendor can request identification and perform verification and/or authorization. The buyer can then enter a VU and the seller can certify the avatar of the buyer using various means for certification including gestures, voice, encrypted tokens etc. The seller can then complete transaction outside of the VU.

Additionally, when using technology such as VoIP, audio consistency could be achieved by converting the participant's voice to text, then to have a corollary conversion back to a consistent voice for the avatar. The voice that the customer hears could also be culled from a collection of prerecorded clips via a text to speech converter. Thus, the Web server, VU server or the third party biometric server could produce a computer generated voice such as those provided by automated operators or weather services. In some embodiments the voice attributes could be selected by the client based on a sampling menu of all available voices. Additionally, regional accents and dialects could be selected. For example a user could select a southern drawl, a New Jersey accent, or a foreign accent. This selectable audio allows the customer to have the consistency of experience that is desired using a self customized interface. Some of the techniques available for providing voice consistency include certificate signing requests (CSRs). Some of these techniques include; (a) real-CSR-text to synthesized voice, (b) real-CSR-voice converted, decoded, and re-encoded as synthesized voice; (c) real-CSR-text to recorded voice snippets; and (d) real-CSR-voice to recorded voice snippets.

Generally, a CSR can be utilized in a public key infrastructure system as a message sent from an applicant to a certifying authority to apply for a digital identify certificate. Before creating a CSR, the applicant can generate a key pair, keeping a private key secret. The CSR can contain information identifying the applicant. The CSR may be accompanied by other credentials or proofs of identity required by the certificate authority, and the certificate authority may contact the applicant for further information. To reiterate, any of these options could be used, although synthesized voice outputs (i.e., the first two options) arguably offer greater conversational flexibility.

An implementation of the process described above, may be stored on, or transmitted across some form of computer readable media. Computer readable media can be any available media that can be accessed by a computer. By way of example, and not limitation, computer readable media may comprise "computer storage media" and "communications media." "Computer storage media" include volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. "Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Reference to particular configurations of hardware and/or software, those of skill in the art will realize that embodiments of the present disclosure may advantageously be implemented with other equivalent hardware and/or software systems. Aspects of the disclosure described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the disclosure are also encompassed within the scope of the disclosure.

Each process disclosed herein can be implemented with a software program. The software programs described herein may be operated on any type of computer, such as personal computer, server, etc. Any programs may be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet, intranet or other networks. Such signal-bearing media, when carrying computer-readable instructions that direct the functions of the disclosed arrangements, represent embodiments of the present disclosure.

The disclosed embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code can include at least one processor, logic, or a state machine coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

What is claimed is:

1. A method, in a data processing system, for utilizing a voiceprint to authorize a user to perform an operation restricted to authorized users, comprising:
    a first computing device transmitting an utterance request;
    the first computing device processing a first utterance in reply to the utterance request to create a voiceprint;
    a storage system storing the voiceprint in an audio attribute file;
    the storage system associating the voiceprint in the audio attribute file with a user of a virtual universe provided in the data processing system;
    the first computing device receiving a second utterance associated with the user; and
    performing identification of the user based on the second utterance by comparing the second utterance to the voiceprint;
    if the identification is successful, allowing the user to access services or authorizing the user to perform operations that are restricted to authorized users;
    detecting a movement of an avatar representing the user in a first virtual environment provided by the first computing device to a second virtual environment of a second computing device, different from the first computing device; and
    in response to detecting the movement of the avatar from the first virtual environment to the second virtual environment, transmitting the audio attribute file to the second computing device, wherein the audio attribute file is used by the second computing device to identify the user for accessing services or authorizing the user to perform operations that are restricted to authorized users on the second computing device.

2. The method of claim 1, further comprising creating a voiceprint in response to user settings, wherein the user settings specify at least one attribute for modifying the first utterance so that a modified first utterance is not the user's natural voice, and wherein the voiceprint is generated based on the modified first utterance.

3. The method of claim 1, further comprising transmitting a prompt to the client application requesting an utterance to authenticate the user in response to user interactions that control an activity related to the avatar.

4. The method of claim 1, further comprising transmitting a second utterance request based on an expiration of a predetermined time period to obtain the second utterance.

5. The method of claim 1, further comprising encrypting the first utterance.

6. The method of claim 1, further comprising time-stamping the first utterance and comparing the timestamp to a current time to authenticate the user, wherein if the current time is at least a threshold amount of time different from the timestamp, then authentication of the user is unsuccessful.

7. The method of claim 1, further comprising:
  receiving a first identifier with the first utterance, wherein the first identifier is an identifier unique to the user;
  receiving a second identifier with the second utterance; and
  comparing the first identifier and the second identifier, along with the performing of identification of the user based on the second utterance, to authenticate the user.

8. A system for utilizing a voiceprint to authorize a user to perform an operation restricted to authorized users, comprising:
  one or more processors, one or more computer-readable memories, and one or more computer-readable, tangible storage devices;
  program instructions, stored on at least one of the one or more storage devices for execution by at least one of the one or more processors via at least one of the one or more memories, to provide transmissions to a client application and to provide an interactive environment having at least one avatar;
  program instructions, stored on at least one of the one or more storage devices for execution by at least one of the one or more processors via at least one of the one or more memories, to send an enrollment request to the client application, to receive a reply from the client application, and to create a voice profile for the at least one avatar;
  program instructions, stored on at least one of the one or more storage devices for execution by at least one of the one or more processors via at least one of the one or more memories, to receive a transmission having an utterance from the client application and to compare the utterance to the voice profile and to authenticate the at least one avatar based on the comparison and allow the at least one avatar to access services or authorize the at least one avatar to perform operations that are restricted to authorized users;
  program instructions, stored on at least one of the one or more storage devices for execution by at least one of the one or more processors via at least one of the one or more memories, to detect a movement of the at least one avatar from a first virtual environment provided by a first computing device to a second virtual environment of a second computing device, different from the first computing device; and
  program instructions, stored on at least one of the one or more storage devices for execution by at least one of the one or more processors via at least one of the one or more memories, to, in response to detecting the movement of the at least one avatar from the first virtual environment to the second virtual environment, transmit the audio attribute file to the second computing device for use by the second computing device to identify the user for accessing services or authorizing the user to perform operations that are restricted to authorized users on the second computing device.

9. The system of claim 8, wherein the voice biometric module and the authentication module are a remotely located from the processing module.

10. The system of claim 8, further comprising program instructions, stored on at least one of the one or more storage devices for execution by at least one of the one or more processors via at least one of the one or more memories, to provide text to speech conversion to be used when generating the voice profile.

11. The system of claim 8, further comprising program instructions, stored on at least one of the one or more storage devices for execution by at least one of the one or more processors via at least one of the one or more memories, to provide voice reconstruction to reconstruct a modified voice based on the received utterance and one or more user settings, wherein the one or more user settings specify at least one attribute for modifying the utterance so that a modified utterance is not the user's natural voice, and wherein the modified utterance is used to compare with the voice profile.

12. The system of claim 8, further comprising program instructions, stored on at least one of the one or more storage devices for execution by at least one of the one or more processors via at least one of the one or more memories, to associate a first identifier with the voice profile, wherein the first identifier is an identifier unique to the user;
  program instructions, stored on at least one of the one or more storage devices for execution by at least one of the one or more processors via at least one of the one or more memories, to receive a second identifier with the utterance; and
  program instructions, stored on at least one of the one or more storage devices for execution by at least one of the one or more processors via at least one of the one or more memories, to compare the first identifier and the second identifier to authenticate the user.

13. A computer program product for utilizing a voiceprint to authorize a user to perform an operation restricted to authorized users, the computer program product comprising:
  one or more computer-readable, tangible storage devices;
  program instructions, stored on at least one of the one or more storage devices, to transmit an utterance request;
  program instructions, stored on at least one of the one or more storage devices, to receive a reply to the utterance request;
  program instructions, stored on at least one of the one or more storage devices, to process the utterance request to create a voiceprint, the voiceprint generated via a user assembly process;
  program instructions, stored on at least one of the one or more storage devices, to store the voiceprint in an audio attribute file that can be acquired, imported, exported and updated;
  program instructions, stored on at least one of the one or more storage devices, to associate the voiceprint with an avatar of a first virtual universe; and
  program instructions, stored on at least one of the one or more storage devices, to authorize the avatar to access services or authorize the avatar to perform operations that are restricted to authorized users;
  program instructions, stored on at least one of the one or more storage devices, to detect a movement of the avatar from the first virtual universe provided by a first computing device to a second virtual universe of a second computing device, different from the first computing device; and program instructions, stored on at least one of the one or more storage devices, to in response to detecting the movement of the avatar from the first virtual universe to the second virtual universe, transmit the audio attribute file to the second computing device for use by the second computing device to identify the avatar for accessing services or authorizing the avatar to perform operations that are restricted to authorized avatars on the second computing device.

14. The computer program product of claim 13, further comprising program instructions, stored on at least one of the one or more storage devices, to transmit a prompt to the client application and request an utterance to authenticate the participant when the avatar moves to a new medium.

15. The computer program product of claim 13, further comprising program instructions, stored on at least one of the one or more storage devices, to prompt the client application for an utterance to authenticate the participant based on a predetermined time period, to receive an utterance associated with the avatar, and to identify the avatar based on the received utterance.

16. The computer program product of claim 13, further comprising program instructions, stored on at least one of the one or more storage devices, to encrypt the utterance.

17. The computer program product of claim 13, further comprising program instructions, stored on at least one of the one or more storage devices, to time-stamp the utterance and compare the timestamp to wall clock time to authenticate the utterance.

18. The computer program product of claim 13, further comprising program instructions, stored on at least one of the one or more storage devices, to attach an identifier to an utterance transmission to authenticate the utterance.

19. The method of claim 2, wherein the at least one attribute for modifying the first utterance is an attribute specifying a blending of the first utterance with another voice that is not the user's voice.

20. The method of claim 7, wherein the first identifier is one of an attribute of the avatar.

* * * * *